United States Patent
Hallouin et al.

(10) Patent No.: US 11,035,255 B2
(45) Date of Patent: Jun. 15, 2021

(54) BLADE EQUIPPED WITH A COOLING SYSTEM, ASSOCIATED GUIDE VANES ASSEMBLY AND ASSOCIATED TURBOMACHINE

(71) Applicant: Safran Helicopter Engines, Bordes (FR)

(72) Inventors: Baptiste Hallouin, Moissy-Cramayel (FR); Jean-Luc Breining, Moissy-Cramayel (FR); Damien Laberny, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 377 days.

(21) Appl. No.: 15/776,056

(22) PCT Filed: Nov. 10, 2016

(86) PCT No.: PCT/FR2016/052921
§ 371 (c)(1),
(2) Date: May 14, 2018

(87) PCT Pub. No.: WO2017/085380
PCT Pub. Date: May 26, 2017

(65) Prior Publication Data
US 2020/0263565 A1    Aug. 20, 2020

(30) Foreign Application Priority Data
Nov. 19, 2015   (FR) ..................................... 1561123

(51) Int. Cl.
*F01D 9/02*    (2006.01)
*F01D 25/24*   (2006.01)
*F02C 7/18*    (2006.01)

(52) U.S. Cl.
CPC ............. *F01D 25/246* (2013.01); *F01D 9/02* (2013.01); *F02C 7/18* (2013.01); *F05D 2240/12* (2013.01); *F05D 2240/81* (2013.01)

(58) Field of Classification Search
CPC . F01D 5/18; F01D 5/181; F01D 5/182; F01D 5/183; F01D 5/184; F01D 5/186;
(Continued)

(56) References Cited

U.S. PATENT DOCUMENTS

| | | | | |
|---|---|---|---|---|
| 3,075,744 | A | * | 1/1963 | Peterson ................. F01D 5/182 415/115 |
| 3,224,194 | A | * | 12/1965 | De Feo ................. F01D 17/162 60/793 |
| 6,769,865 | B2 | * | 8/2004 | Kress ....................... F01D 9/04 415/113 |

FOREIGN PATENT DOCUMENTS

| | | |
|---|---|---|
| EP | 0 919 698 A1 | 6/1999 |
| EP | 0 974 733 A2 | 1/2000 |

(Continued)

OTHER PUBLICATIONS

International Search Report dated Feb. 20, 2017, issued in corresponding International Application No. PCT/FR2016/052921, filed Nov. 10, 2016, 4 pages.

*Primary Examiner* — Kenneth Bomberg
*Assistant Examiner* — Maxime M Adjagbe
(74) *Attorney, Agent, or Firm* — Christensen O'Connor Johnson Kindness PLLC

(57) ABSTRACT

The present disclosure relates to a blade of a guide vane assembly of a turbomachine fitted with a cooling system, generally including an insert arranged inside an internal cavity of said blade, connected to a cooling air inlet of the blade and designed to cool the surface of the internal cavity of the blade, and a bleed device configured to bleed some of the cooling air inside the insert and designed to send this (Continued)

bled cooling air to a central hub of the turbomachine. The bleed device of the blade may further include a bleed head arranged in the internal cavity of the blade and passing through an opening of the insert, and configured to bleed some of the cooling air inside the insert.

7 Claims, 2 Drawing Sheets

(58) Field of Classification Search
CPC .......... F01D 5/187; F01D 5/188; F01D 5/189; F01D 9/02; F01D 9/065; F05D 2260/20; F05D 2260/12
See application file for complete search history.

(56) References Cited

FOREIGN PATENT DOCUMENTS

| | | |
|---|---|---|
| EP | 1 538 306 A1 | 6/2005 |
| EP | 2 613 004 A2 | 7/2013 |

\* cited by examiner

BLADE EQUIPPED WITH A COOLING SYSTEM, ASSOCIATED GUIDE VANES ASSEMBLY AND ASSOCIATED TURBOMACHINE

TECHNICAL FIELD

Embodiments of the disclosure relate to a blade of a guide vane assembly of a turbomachine. In some embodiments, the disclosure relates to a blade of a guide vane assembly fitted with a cooling system for the blade and for other parts of the turbomachine.

BACKGROUND

A turbomachine generally comprises, from upstream to downstream, one or more compressor stages, for example a low-pressure compressor and a high-pressure compressor, a combustion chamber, one or more turbine stages, for example a high-pressure turbine and a low-pressure turbine. Upstream and downstream are defined relative to the normal gas flow direction in an outflowing jet (from upstream to downstream).

The turbine converts the thermal and kinetic energy of the gas flow coming from the combustion chamber into mechanical energy required, for example, to drive the compressor and/or rotor in the case of a helicopter.

The turbine usually comprises one or more blade stages, each stage generally comprising, in a known manner, a fixed cascade called a guide vane assembly and a moving cascade. The assembly of blades in a cascade is sometimes referred to as "blading". The blades comprise a section directed upstream, called a leading edge, and a section directed downstream, called a trailing edge.

The guide vane assembly is generally cooled by forced convection, by means of circuits running through the inside of the blades and forming a labyrinth. The cooling air enters the blades on the side of the combustion chamber of the turbine on the periphery of the combustion chamber, at a section of each blade of the guide vane assembly called the external meridian. The cooling air circulates from the external meridians and passes through the blades, so as to cool the blades on the inside (including the leading edges of the blades) up to a section of each blade of the guide vane assembly called the internal meridian, located on the side of a central hub of the turbine. The terms cooling air or cold air designate air whose temperature is lower than the temperature of the gas flowing in the outflowing jet of the turbomachine and used to lower the temperature of the elements located in the outflowing jet.

Some of the cooling air is bled at these internal meridians to be sent to the hub, so as to cool other parts of the turbine. Nevertheless, in cooling systems where the blades are cooled by means of labyrinth-type circuits, the air sent to the hub is air that has been heated at the leading edges of the blades and therefore has a higher temperature than the cooling air. In addition, the quantity of cooling air consumed is significant.

Other cooling systems include inserts or double skins, arranged inside the blades and used to cool the internal surface of the blades. In some embodiments, the inserts comprise a wall with multiple perforations used to cool the leading edges of the blades by means of impacts of cold air. These inserts are used to reduce air consumption in relation to labyrinth-type cooling systems. In addition, the convective heat transfer coefficients are higher than those created by the labyrinth-type system. In some cases, these inserts are extended so that they cross the internal meridian in order to route some of the bleed air towards other parts of the turbine, via the hub.

However, this insert configuration causes a significant leakage of cold air at the interface between the insert and the internal meridian. The air escaping owing to this leakage is lost (particularly in the outflowing jet of gases) and does not serve to cool the blades or other parts of the turbine.

The inventors have therefore sought a way to improve the blades of existing guide vane assemblies.

SUMMARY

The disclosure aims to alleviate at least some of the disadvantages of known blades.

In some embodiments, the disclosure aims to provide, in at least one embodiment of the disclosure, a blade fitted with a cooling system that is used to effectively cool the blade and other parts of a turbomachine in which the blade is installed.

The disclosure also aims to provide, in at least one embodiment, a blade fitted with a cooling system limiting the consumption of cooling air.

The disclosure also aims to provide, in at least one embodiment, a blade fitted with a cooling system reducing the loss of cooling air.

The disclosure also aims to provide, in at least one embodiment, a blade fitted with a cooling system used to limit the heating of air passing through the blade in order to cool other parts of the turbomachine.

To that end, the disclosure relates to a blade of a guide vane assembly of a turbomachine fitted with a cooling system comprising:
  an insert arranged inside an internal cavity of the blade, connected to a cooling air inlet of the blade and designed to cool the surface of the internal cavity of the blade,
  a bleed device, configured to bleed some of the cooling air inside the insert and designed to send it to a central hub of the turbomachine, characterized in that the bleed device comprises:
  a bleed head, arranged in the internal cavity of the blade and passing through an opening of the insert, and configured to bleed some of the cooling air inside the insert.

A blade according to the disclosure thus enables, via its cooling system, a direct bleeding of some of the cooling air in the insert before it is heated by elements to be cooled. The cooling air is therefore routed into the hub, centripetally, minimizing the extent to which it is heated between its arrival through the inlet of the blade and its arrival at the hub. The temperature of the air arriving at the hub is therefore close to the temperature of the air at the inlet of the insert. Once the cooling air is sent to the hub, it is used to cool other elements of the turbomachine.

In addition, the arrangement of the bleed head in the internal cavity of the blade enables the containment of potential air leakages at the opening of the insert in which the bleed head is arranged, which remain inside the internal cavity of the blade. These air leakages are thus controlled; they contribute to the cooling of the blades and the air coming from leakages is not lost.

Advantageously and according to the disclosure, the bleeding device comprises a bleed duct, connected on one hand to the blade by a first ball joint and designed to be connected on the other hand to a central hub of the turbomachine by a second ball joint, designed to send the bleed air coming from the bleed head to the hub of the turbomachine.

According to this aspect of the disclosure, the ball joint-type mechanical connections connecting the bleed duct to the blade and to the hub enable the air bled by means of the bleed head to be sent to the hub, while retaining the possibility of displacements between the blade of the guide vane assembly and the hub. These displacements are due in particular to the action of thermo-mechanical loads and may damage the bleed duct in the absence of these ball joints.

Advantageously and according to this last aspect of the disclosure, the bleed head and the bleed duct are integrally connected.

According to this aspect of the disclosure, the bleed head and the bleed duct form a single piece, called a bleed mechanism, which is easy to manufacture without needing to change the blade significantly. In this variant of the disclosure, the gap between the bleed head and the opening in the insert is designed to allow displacement of the bleed head, since this is integral with the bleed duct which is able to move when the blade and/or hub move, while minimizing air leakage at the opening.

Advantageously and according to the disclosure, the bleed head and the blade are integrally connected.

According to this aspect of the disclosure, the bleed head is fixed, which enables the gap between the opening of the insert and the bleed head to be reduced and thus reduces air leakage at the opening. The bleed head may be formed of a section of the blade and thus be manufactured when the blade is manufactured.

The disclosure also relates to a guide vane assembly comprising a plurality of blades arranged around a central hub of the turbomachine, characterized in that at least one blade of the guide vane assembly is a blade according to the disclosure.

The disclosure also relates to a turbomachine, comprising a central hub and characterized in that it comprises a guide vane assembly according to the disclosure.

The disclosure also relates to a blade, a guide vane assembly and a turbomachine characterized by a combination of all or some of the features mentioned above or below.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The following embodiments are examples. Although the description refers to one or more embodiments, this does not necessarily mean that each reference relates to the same embodiment, or that the features apply only to a single embodiment. Single features of different embodiments may also be combined to provide other embodiments. In the figures, scales and proportions are not strictly adhered to and this is for the purposes of illustration and clarity.

Figure 1:
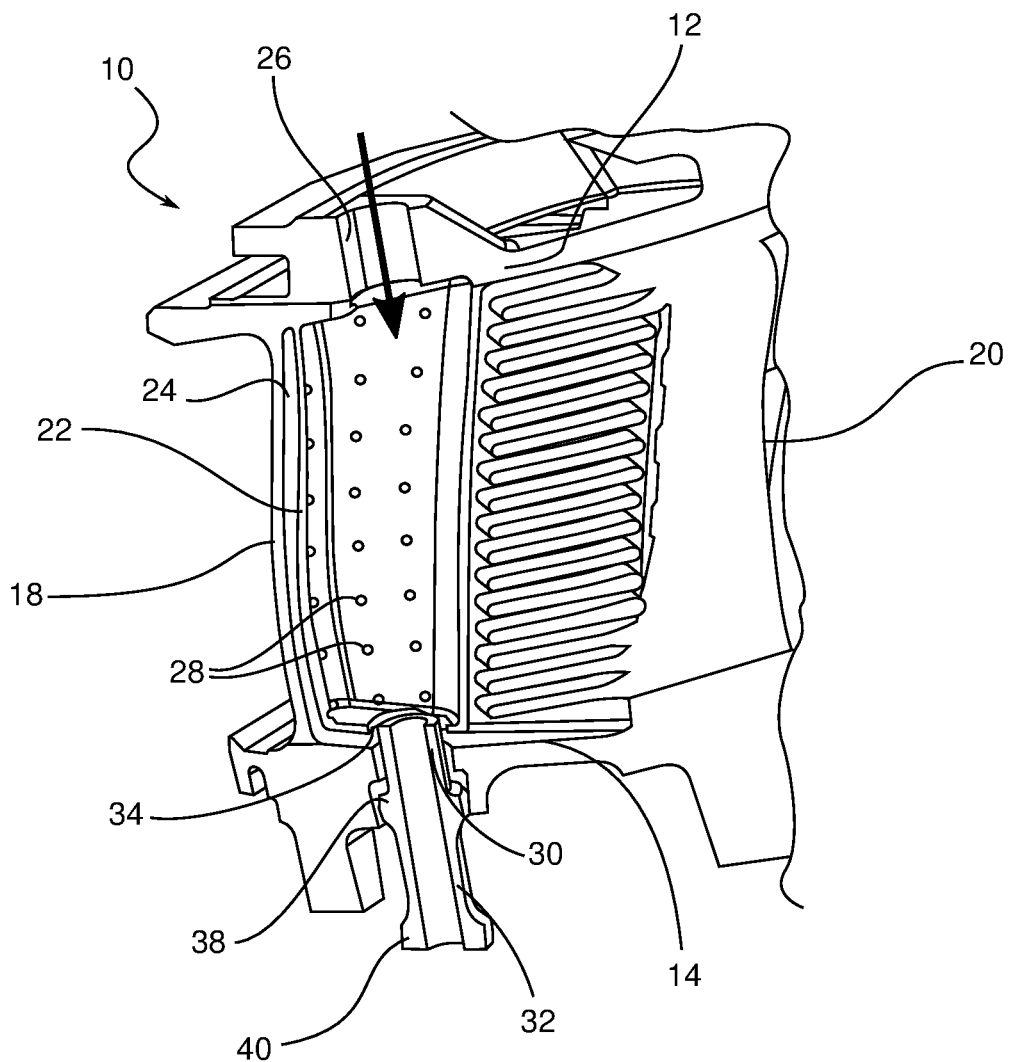
FIG. 1 is a schematic perspective view of a blade of a guide vane assembly fitted with a cooling system according to a first embodiment of the disclosure.
Figure 2:
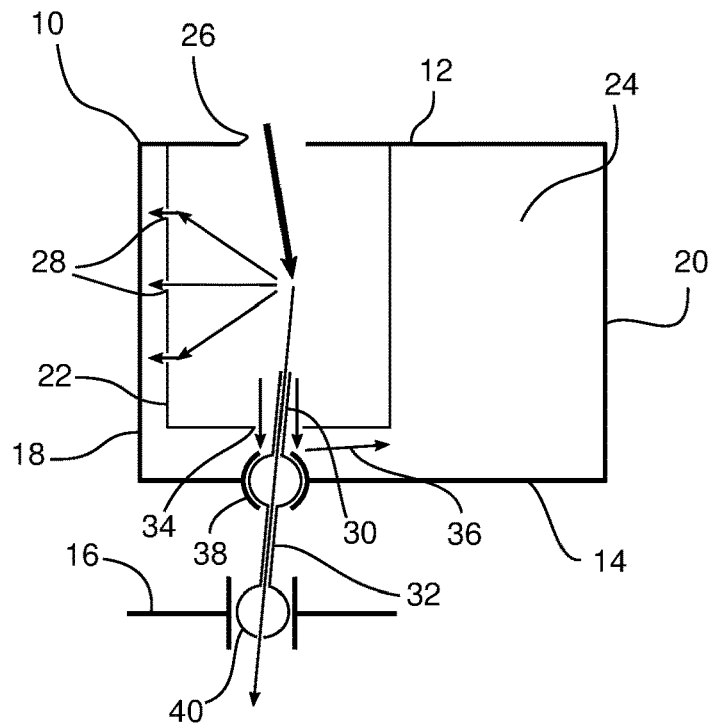
FIG. 2 is a schematic cross-sectional view of a blade of a guide vane assembly fitted with a cooling system according to a first embodiment of the disclosure.
Figure 3:
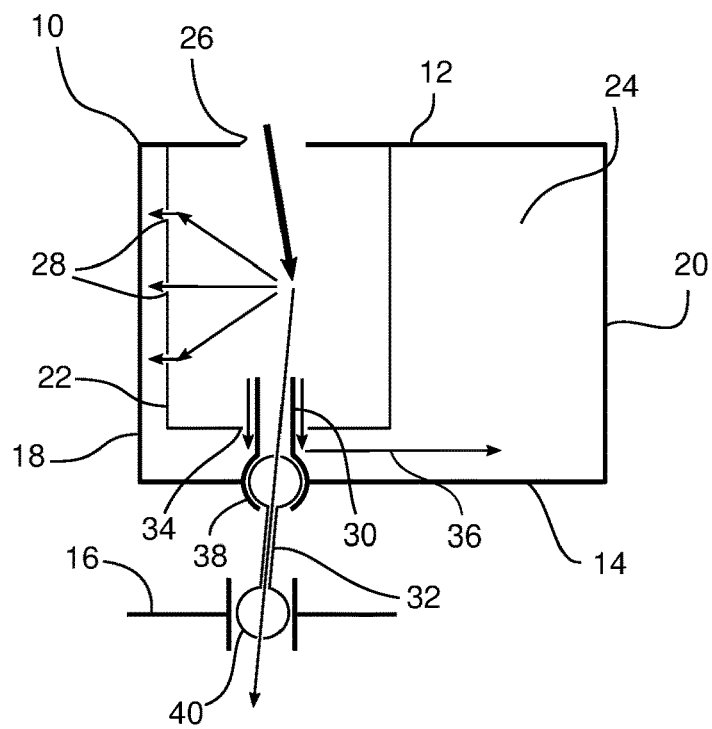
FIG. 3 is a schematic cross-sectional view of a blade of a guide vane assembly fitted with a cooling system according to a second embodiment of the disclosure.

FIGS. 1 to 3 schematically represent, as a perspective view for FIG. 1 and as a cross-sectional view for FIGS. 2 and 3, a blade 10 of a guide vane assembly of a turbomachine. The blade 10, as arranged in a turbomachine, comprises a section called an external meridian 12 located on the side of a combustion chamber (not represented) of the turbomachine, and a section called an internal meridian 14 located on the side of a central hub 16 of the turbomachine around which the rotational parts of the turbomachine turn. In addition, a gas passes through the turbomachine from upstream to downstream, and the section of the blade 10 directed upstream is called the leading edge 18 and the section of the blade 10 directed downstream is called the trailing edge 20. The blade 10 is fitted with a cooling system according to various embodiments described below. In FIGS. 1 to 3, arrows partially represent the circulation of the cooling air in the various elements of the blade 10 and/or of the cooling system.

The blade 10 represented in FIGS. 1 and 2 is fitted with a cooling system according to a first embodiment of the disclosure.

The cooling system comprises an insert 22, also called a double skin, arranged in an internal cavity 24 of the blade 10, and connected to a cooling air inlet 26 of the blade 10. The insert comprises micro-perforations 28 for creating impacts of cold air on the surface of the internal cavity 24 of the blade 10, in particular at the leading edge 18.

The cooling system further comprises a bleed device, comprising a hollow bleed head 30, arranged in the internal cavity 24 of the blade 10 and configured to bleed some of the cooling air inside the insert 22. To do this, the bleed head 30 passes through an opening 34 of the insert 22, so that some of the air circulating in the insert 22 enters the bleed head 30.

The gap between the opening 34 and the bleed head 30 causes leakages 36 of cooling air. Since the bleed head 30 is arranged in the internal cavity 24 of the blade 10, the air leaking due to these leakages 36 remains inside the internal cavity 24 of the blade 10 and thus participates in the cooling of the blade 10.

The bleed device further comprises a hollow bleed duct 32, designed to send the air bled inside the insert 22 coming from the bleed head 30 and to send it to the central hub 16.

The bleed duct 32 is connected on one hand to the blade 10 by a first ball joint connection 38 and on the other hand to the hub 16 by a second ball joint connection 40. In some embodiments, the first ball joint connection 38 is located on the internal meridian 14 of the blade 10, since this section of the blade 10 is located near and facing the hub 16. The ball joint connections 38, 40 form mechanical connections enabling the blade 10 and the hub 16 to move relative to each other.

In this first embodiment, the bleed head 30 and the bleed duct 32 are integrally connected and form a single piece called a bleed mechanism.

Due to the presence of the first ball joint connection 38 between the bleed duct 32 and the blade 10, the bleed head 30 is able to move into the opening 34 of the insert 22 in the event of displacement of the blade 10 relative to the hub 16. Thus, the dimensions of the opening 34 are designed for this displacement of the bleed head 30: the gap between the opening 34 and the bleed head 30 is large enough to allow the displacement of the bleed head 30, but small enough to minimize air leakages 36. As described above, these air leakages 36 are in all cases controlled and participate in the cooling of the blade 10; they do not therefore represent a loss of cooling air.

The blade 10 represented in FIG. 3 is fitted with a cooling system according to a second embodiment of the disclosure.

This embodiment is similar to the first embodiment described above, but the bleed head 30 is not integrally connected to the bleed duct 32: the bleed head 30 is integrally connected to the blade 10, in particular at the internal meridian 14 of the blade, facing the hub 16 of the turbomachine. The bleed head 30 may for example be formed of a section of the blade 10 and manufactured with the blade 10 in the same material.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A blade of a guide vane assembly of a turbomachine fitted with a cooling system, the blade comprising:
   an insert arranged inside an internal cavity of said blade, connected to a cooling air inlet of the blade, and configured to cool the surface of the internal cavity of the blade, and
   a bleed device comprising:
      a bleed head arranged in the internal cavity of the blade and passing through an opening of the insert, and configured to bleed some of the cooling air inside the insert; and
      a bleed duct connected at a first portion to the blade by a first ball joint, and configured to be connected at a second portion to a central hub of the turbomachine by a second ball joint, the bleed duct configured to send the cooling air bled from the bleed head to the hub of the turbomachine.

2. The blade according to claim 1, wherein the bleed head and the bleed duct are integrally connected.

3. The blade according to claim 1, wherein the bleed head and the blade are integrally connected.

4. A guide vane assembly, comprising
   a plurality of blades to be arranged around a central hub, wherein the plurality of blades includes at least one blade according to claim 1.

5. A turbomachine, comprising
   the central hub; and
   the guide vane assembly according to claim 4,
   wherein the plurality of blades of the guide vane assembly are arranged around the central hub.

6. The blade according to claim 1, wherein the bleed head passes through an opening of the insert such that there is a gap between the opening and the bleed head.

7. The blade according to claim 1, wherein the blade has an internal meridian located near and facing the hub and the first ball joint connection is located on the internal meridian of the blade.

* * * * *